May 23, 1933.  L. A. BIXBY  1,910,084
CLUTCH
Filed May 26, 1930
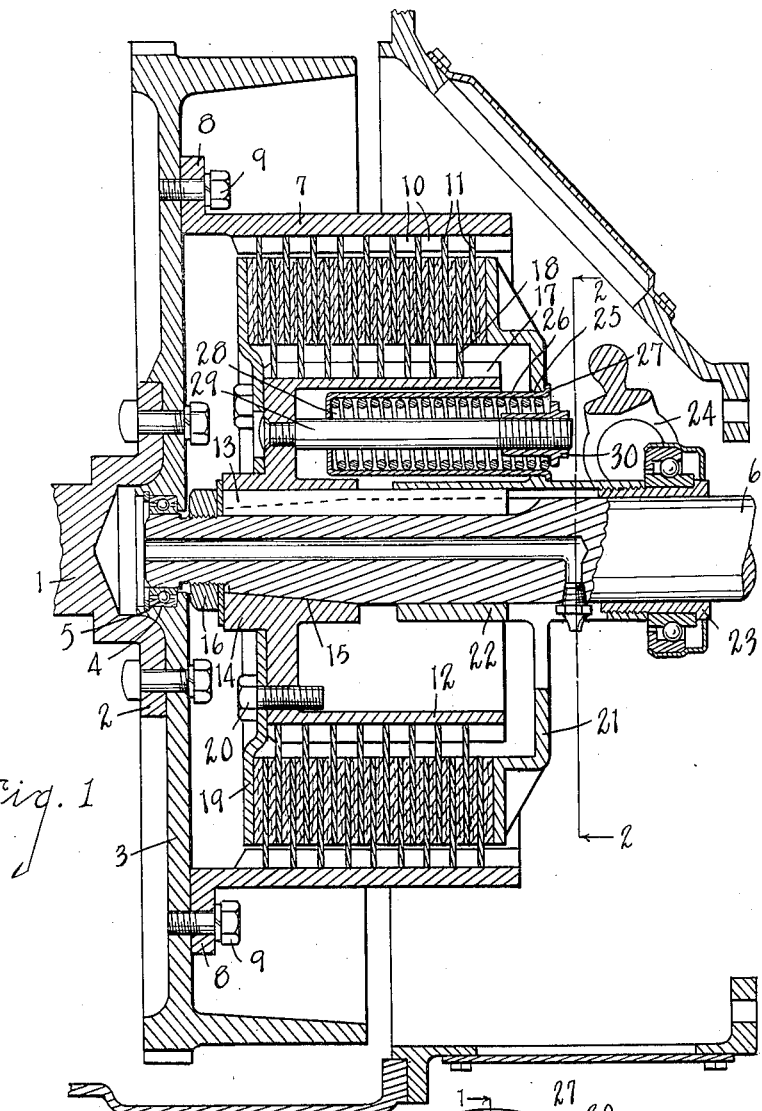
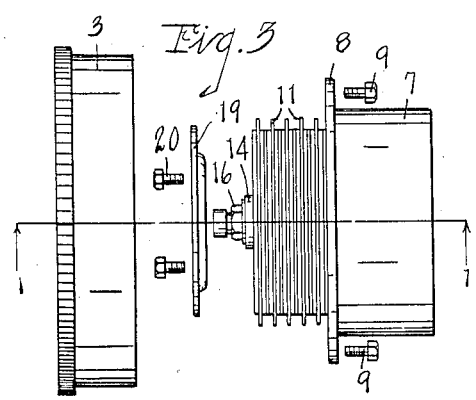
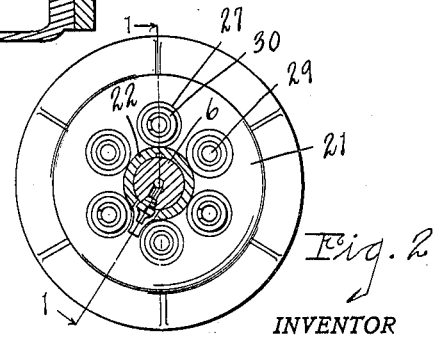
INVENTOR
Leo A. Bixby
BY Chappell Earl
ATTORNEYS Patented May 23, 1933

1,910,084

UNITED STATES PATENT OFFICE

LEO A. BIXBY, OF KALAMAZOO, MICHIGAN, ASSIGNOR TO FULLER & SONS MANUFACTURING CO., OF KALAMAZOO, MICHIGAN, A SUBSIDIARY OF UNIT CORPORATION OF AMERICA

CLUTCH

Application filed May 26, 1930. Serial No. 455,607.

The main objects of this invention are:

First, to provide an improved clutch in which the parts are so arranged that the clutch disks may be removed and replaced without entirely disassembling the clutch from the vehicle.

Second, to provide an improved clutch in which chattering is minimized.

Third, to provide an improved clutch in which a plurality of pressure springs are provided and are so arranged and supported that breakage is minimized, and one in which the springs may be readily adjusted to vary the pressure and are accessible for removal and renewal.

Objects pertaining to details and economies of my invention will definitely appear from the description to follow. The invention is defined in the claims.

A structure which embodies the features of my invention is clearly illustrated in the accompanying drawing, in which:

Fig. 1 is a fragmentary view of a structure embodying the features of my invention, mainly in longitudinal section on line 1—1 of Figs. 2 and 3.

Fig. 2 is a transverse section on line 2—2 of Fig. 1.

Fig. 3 is a disassembled view of certain of the parts, particularly illustrating the method of assembling and disassembling the clutch disks.

In the accompanying drawing, I represents a crank or driving shaft which is provided with a flanged head 2 facilitating the attachment of the fly-wheel 3, the fly-wheel becoming, in effect, a part of the driving member of the clutch. The fly-wheel is recessed at 4 to receive a bearing 5 for the inner end of the driven shaft 6. The driving and driven shafts are thus supported coaxially. The bearings for the outer end of the driven shaft are not illustrated.

The clutch drum 7 is provided with an out-turned flange 8 at its inner end secured to the web of the flywheel by means of the screws 9. This drum has internal longitudinal driving lugs 10 coacting with the driving disks 11.

The barrel-like driven member 12 is keyed to the driven shaft 6 by means of the key 13. This driven member has an internally tapered hub portion 14 at its inner end engaging the tapered portion 15 of the shaft and clamped thereon by means of the nut 16. The driven member 12 is provided with a removable end plate 19 at its inner end which is detachably mounted on the driven member by means of the screws 20. When this end plate is removed the disks 18 may be slipped off their driving lugs for replacing or the like.

The thrust member 21 is provided with a hub 22 of substantial length slidable upon the driven shaft and having driving engagement therewith through the key 13. The hub member is slidably engaged with this key.

The outer end of the hub of the thrust member is internally threaded to receive the adjusting collar 23 actuated through the adjusting yoke 24. The actuating means for this yoke is not illustrated.

The thrust member has a plurality of holes 25 therein uniformly spaced around its hub and adapted to receive the spring supporting cups 26 which have supporting flanges 27 at their outer ends. The springs 28 are arranged within these cups with their outer ends supported by the pins 29 mounted on the web of the driven member and having spring supporting thrust members 30 at their outer ends. These thrust members 30 are threaded for adjustment upon the pins.

With this arrangement of parts the thrust member 21 is urged by the springs to clamp the clutch disks, the pressure of the springs being uniformly distributed. The springs are economical to produce and should one or more of the springs become broken the clutch still remains operative, which is not the case where a single thrust spring is employed.

The springs are supported by the cup-like holders so that they cannot buckle or be distorted in use, and they are very easily assembled and disassembled should occasion require.

By providing the thrust plate or disk with a hub of considerable length and splining the same to the shaft, chattering is prevented, and lost motion eliminated which is commonly present where the pressure plate is engaged with a plurality of pins. It will be noted that the key by which the driven member is secured to the driven shaft also serves as a key for the pressure disk.

Further, it is unnecessary to entirely remove the clutch from its assembly in the vehicle when it is desired to renew or reface the clutch disks. This may be accomplished by freeing a portion of the transmission housing, which permits the clutch unit to be moved back sufficiently to afford access to its inner end so that the detachable plate 19 of the driven member may be removed and the disks slipped from their driving lugs.

It will be understood that the driving drum 7 is also detachable from the fly-wheel which allows it to be moved outwardly.

Certain of the parts are shown in their disassembled relation in Fig. 3.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a clutch, the combination of a driving shaft, a fly-wheel mounted on said driving shaft and provided with a driven shaft bearing, a driven shaft engageable and disengageable with said bearing by a longitudinal movement, a drum-like driving clutch member detachably mounted on said fly-wheel and provided with internal disk engaging lugs, a barrel-like driven clutch member disposed within said driving clutch member and having external disk engaging lugs, and provided with a hub portion at its inner end engaging said driven shaft, a disk-supporting plate detachably mounted on the inner end of said driven clutch member, a key for securing said driven clutch member hub to said driven shaft projecting outwardly from said hub, coacting driving and driven clutch disks operatively associated with said driving and driven clutch members, a thrust member operatively associated with said disks and having a hub of substantial length slidably mounted on said driven shaft and coacting with said key, said thrust member having a plurality of spaced openings therein, a plurality of spring supporting pins mounted on said driven clutch member to project centrally through said openings in said thrust member, spring supporting members having supporting flanges at their outer ends arranged in said openings to engage said pins, coiled springs arranged within said supporting members, and spring thrust members on the outer ends of said pins.

2. In a clutch, the combination of a driving shaft, a fly-wheel mounted on said driving shaft and provided with a driven shaft bearing, a driven shaft engageable and disengageable with said bearing by a longitudinal movement, a drum-like driving clutch member detachably mounted on said fly-wheel and provided with internal disk engaging lugs, a barrel-like driven clutch member disposed within said driving clutch member and having external disk engaging lugs and provided with a hub portion at its inner end engaging said driven shaft, a disk supporting plate detachably mounted on the inner end of said driven clutch member, a key for securing said driven clutch member hub to said driven shaft projecting outwardly from said hub, coacting driving and driven clutch disks operatively associated with said driving and driven clutch members, a thrust member operatively associated with said disks and having a hub of substantial length slidably mounted on said driven shaft and coacting with said key.

3. In a clutch, the combination of a driven shaft, a drum-like driving clutch member provided with internal disk engaging lugs, a barrel-like driven clutch member disposed within said driving clutch member and having external disk engaging lugs and provided with a hub portion at its inner end engaging said driven shaft, a disk supporting plate detachably mounted on the inner end of said driven clutch member, a key for securing said driven clutch member hub to said driven shaft projecting outwardly from said hub, coacting driving and driven clutch disks operatively associated with said driving and driven clutch members, a thrust member operatively associated with said disks and having a hub of substantial length slidably mounted on said driven shaft and coacting with said key, said thrust member having a plurality of spaced openings therein, a plurality of spring supporting pins mounted on said driven clutch member to project centrally through said openings in said thrust member, spring supporting members arranged in said openings in said thrust member to engage said pins, coiled springs arranged within said supporting members, and spring thrust members on the outer ends of said pins.

4. In a clutch, the combination of a driven shaft, a drum-like driving clutch member provided with internal disk engaging lugs, a barrel-like driven clutch member disposed within said driving clutch member and having external disk engaging lugs and provided with a hub portion at its inner end engaging said driven shaft, a disk supporting plate detachably mounted on the inner end of said driven clutch member, a key for securing said driven clutch member hub to said driven shaft projecting outwardly from said hub, coacting driving and driven clutch disks operatively associated with said driving and driven clutch members, a thrust member operatively associated with said disks and having a hub of substantial length slidably mounted on said driven shaft and coacting with said key.

In witness whereof I have hereunto set my hand.

LEO A. BIXBY.